United States Patent
Yanniello (10) Patent No.: US 10,164,412 B1
(45) Date of Patent: Dec. 25, 2018

(54) SWITCHGEAR WITH A TWO-HIGH CIRCUIT INTERRUPTER CONFIGURATION

(71) Applicant: Eaton Corporation, Cleveland, OH (US)

(72) Inventor: Robert Yanniello, Asheville, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/624,972

(22) Filed: Jun. 16, 2017

(51) Int. Cl.
*H02B 13/035* (2006.01)

(52) U.S. Cl.
CPC ..... *H02B 13/0358* (2013.01); *H02B 13/0352* (2013.01)

(58) Field of Classification Search
CPC .................. H02B 13/035–13/075; H02B 1/22
See application file for complete search history.

(56) References Cited

U.S. PATENT DOCUMENTS

| | | | | |
|---|---|---|---|---|
| 4,146,915 | A * | 3/1979 | Yosida | H02B 11/24 200/50.22 |
| 5,521,567 | A | 5/1996 | Devonald, III et al. | |
| 6,362,445 | B1 | 3/2002 | Marchand et al. | |
| 6,518,531 | B2 | 2/2003 | Arioka | |
| 7,417,846 | B2 * | 8/2008 | Arioka | H02B 13/035 361/604 |
| 7,450,368 | B2 * | 11/2008 | Parker | H02B 1/20 361/600 |
| 8,045,322 | B2 * | 10/2011 | Kurogi | H02B 13/01 361/606 |
| 8,629,367 | B2 | 1/2014 | Zwicky | |
| 8,717,742 | B2 * | 5/2014 | Kim | H02B 11/12 361/612 |
| 8,791,379 | B2 * | 7/2014 | Kikukawa | H02B 1/22 200/5 A |

(Continued)

FOREIGN PATENT DOCUMENTS

| | | |
|---|---|---|
| EP | 3 073 592 A1 | 9/2016 |
| FR | 2555830 A1 | 5/1985 |

(Continued)

OTHER PUBLICATIONS

"Cubicle Type Gas Insulated Switchgear : HMGS," Hyundai Heavy Industries Co., Ltd., 2 pages, Downloaded from the Internet at: www.hyundai-elec.com, Jul. 6, 2017.

(Continued)

*Primary Examiner* — Robert J Hoffberg
(74) *Attorney, Agent, or Firm* — Ward and Smith, P.A.

(57) ABSTRACT

An apparatus includes a housing, at least one first gas-insulated circuit interrupter in the housing and at least one second gas-insulated circuit interrupter disposed in the housing above the at least one first gas-insulated circuit interrupter. The at least one first gas-insulated circuit interrupter and the at least one second gas-insulated circuit interrupter may be housed in respective ones of a first gas containment compartment and a second gas containment compartment vertically arranged in the housing. At least one first bus may be coupled to the at least one first gas-insulated circuit interrupter and at least one second bus may be coupled to the at least one second gas-insulated circuit interrupter. The buses may be disposed between the first and second gas-insulated circuit interrupters.

12 Claims, 10 Drawing Sheets

(56) References Cited

U.S. PATENT DOCUMENTS

| | | | |
|---|---|---|---|
| 8,916,059 B2* | 12/2014 | Glasmacher | H02B 13/055 252/67 |
| 9,906,008 B2* | 2/2018 | Yoshida | H02G 5/007 |
| 2005/0219804 A1 | 10/2005 | Arioka | |
| 2011/0261506 A1 | 10/2011 | Narin et al. | |
| 2013/0050905 A1* | 2/2013 | Kim | H02B 13/045 361/608 |
| 2018/0166866 A1 | 6/2018 | Lu | |

FOREIGN PATENT DOCUMENTS

| | | | | |
|---|---|---|---|---|
| JP | 0476108 U | * | 7/1992 | |
| JP | 05304704 A | * | 11/1993 | |
| JP | 06311614 A | | 11/1994 | |
| JP | 07123541 A | | 5/1995 | |
| JP | 10191514 A | * | 7/1998 | |
| JP | 2011066962 A | | 3/2011 | |
| WO | WO 2013021678 A1 | * | 2/2013 | H02B 13/005 |

OTHER PUBLICATIONS

"GV3 (Single Bus) and GV3D (Double Bus) Gas Insulated Switchgear," TAMCO Switchgear (Malaysia) SDN BHD, Publication 1 GV3/GB3D—Ed 2011, 2 pages.

"Medium voltage switchgear for Substation Solutions, cpg.0 y cpg.1, Families of single and double busbar GIS-type cubicles, up to 40.5 kV," Ormazabal velatia, Downloaded from the Internet at: www.ormazabal.com, Jul. 6, 2017.

"MV Switchgear for Substation Solutions, CPG.0 & CPG.1, Single and double busbar panel type GIS system," Ormazabal velatia, Downloaded from the Internet at: www.ormazabal.com, Jul. 6, 2017.

"ZX2.2 Medium voltage gas-insulated switchgear," ABB, Inc., 1VAL 1001-DB Rev. C, May 2010, 20 pages.

"ZX2.2 Medium voltage switchgear, Increase safety and dependability," ABB, Inc., 1VAL 109901-FL Rev. C, Apr. 2010, 2 pages.

Aufermann et al., "New gas-insulated switchgear for all medium voltage applications," English translation of German publication in the journal "etz 18/2001 p. 20-22."

Fink et al., "New Gas Insulated Switchgear (GIS) for All Medium Voltage Applications," International Power Distribution Congress Cidel Argentina 2002, pp. 1-5.

Notification of Transmittal of the International Search Report and the Written Opinion of the International Searching Authority, or the Declaration, PCT/US2018/030835, dated Jul. 10, 2018, 12 pages.

Notification of Transmittal of the International Search Report and the Written Opinion of the International Searching Authority, or the Declaration, PCT/US2018/030860, dated Jul. 16, 2018, 12 pages.

* cited by examiner

SWITCHGEAR WITH A TWO-HIGH CIRCUIT INTERRUPTER CONFIGURATION

BACKGROUND

The inventive subject matter relates to electrical apparatus and, more particularly, to switchgear.

In typical gas-insulated switchgear (GIS), certain components that are prone to arc generation are placed in closed structures filled with an insulating high-dielectric gas, such as sulfur hexafluoride ($SF_6$). The insulation properties of the gas allow reduced spacing between components and thus enable relatively compact arrangement of the switchgear components. While high-voltage (e.g., 50 kV and above) switchgear is commonly gas-insulated, medium-voltage circuit breakers and other medium-voltage devices may also utilize gas insulated switching components to provide compact form factors for particular industrial and other applications.

A conventional GIS unit may include a housing having one or more gas containments compartments therein filled with insulating gas (e.g., $SF_6$). Circuit interrupters, buses and other components may be housed in the one or more gas containment compartments. Lower voltage control circuitry and mechanisms for operating the circuit interrupters may be housed in one or more control compartments, which may not be filled with insulating gas.

In a typical application, a number of such GIS units may be arranged in a row to provide medium-voltage power distribution to other industrial devices, such as motor drives. The footprint available for such GIS units may be limited and/or expensive, and installation of the GIS units may be difficult and/or expensive due to constraints on the arrangement of feeder buses and other structures that interface with the GIS units. Accordingly, there is an ongoing need for switchgear designs that provide a smaller footprint and may be easier and less expensive to install.

SUMMARY OF THE INVENTION

Some embodiments of the inventive subject matter provide an apparatus including a housing, at least one first gas-insulated circuit interrupter in the housing and at least one second gas-insulated circuit interrupter disposed in the housing above the at least one first gas-insulated circuit interrupter. The at least one first gas-insulated circuit interrupter and the at least one second gas-insulated circuit interrupter may be any of a variety of different types of circuit interrupters, including, for example, vacuum circuit interrupters. The apparatus may further include a first gas containment compartment in the housing and a second gas containment compartment disposed in the housing above the first gas containment compartment. The at least one first gas-insulated circuit interrupter may be disposed in the first gas containment compartment and the at least one second gas-insulated circuit interrupter may be disposed in the second gas containment compartment.

In further embodiments, the apparatus may further include at least one first bus coupled to the at least one first gas-insulated circuit interrupter and configured to be coupled to a first source and at least one second bus coupled to the at least one second gas-insulated circuit interrupter and configured to be coupled to a second source or in common with the first source. The at least one first bus and the at least one second bus may be disposed between the at least one first gas-insulated circuit interrupter and the at least one second gas-insulated circuit interrupter. The at least one first bus and the at least one second bus may be configured to be interconnected via at least one sealed connector. In some embodiments, the at least one first bus may be disposed in the first gas containment compartment and the at least one second bus may disposed in the second gas containment compartment. In further embodiments, the at least one first bus may be disposed in a third gas containment compartment and the at least one second bus may be disposed in a fourth gas containment compartment.

In further embodiments, the apparatus may include a cabling compartment in the housing and adjoining each of the first and second gas containment compartments and first and second buses in the cabling compartment. In some embodiments, the first and second buses in the cabling compartment may be electrically coupled to respective ones of the at least one first gas-insulated circuit interrupter and the at least one second gas-insulated circuit interrupter and configured to be coupled to respective first and second sets of cables within the cabling compartment. The first and second buses may be configured to offset the first and second sets of cables.

Still further embodiments of the inventive subject matter provide a switchgear unit including a housing, a first gas containment compartment in the housing and a second gas containment compartment in the housing and disposed above the first gas containment compartment. A first plurality of circuit interrupters is disposed in the first gas containment compartment and a second plurality of circuit interrupters is disposed in the second gas containment compartment. A first plurality of buses and a second plurality of buses may be coupled to respective ones of the first plurality of vacuum circuit interrupters and the second plurality of vacuum circuit interrupters, configured to be coupled to respective ones of a first source and a second source, and disposed between the first plurality of vacuum circuit interrupters and the second plurality of vacuum circuit interrupters.

Additional embodiments provide a switchgear unit including a housing, a first plurality of gas-insulated circuit interrupters and a second plurality of gas-insulated circuit interrupters vertically stacked in the housing, and at least one bus assembly configured to selectively connect the first and second pluralities of gas-insulated circuit interrupters to at least one feeder bus. The bus assembly may be configured to provide selective interconnection of the first and second pluralities of gas-insulated circuit interrupters.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As used herein and in keeping with terminology commonly used in the electrical switchgear industry, "gas-insulated" refers to insulation using a relatively high dielectric gas (e.g., a pure gas or gas mixture) that has a controlled composition that provides enhanced insulation with respect to, for example, air with an uncontrolled composition. The insulation gas used in a gas-insulated switchgear component may include, for example, a high-dielectric halogenated gas, such as sulfur hexafluoride ($SF_6$) and/or alternatives thereto, such as fluorinated gas (e.g., fluoroketone-based) mixtures. It will be appreciated that the composition of such an insulation gas may be maintained, for example, by containment of the insulation gas within a sealed compartment and/or control of the gas composition using an active control system.

Figure 1:
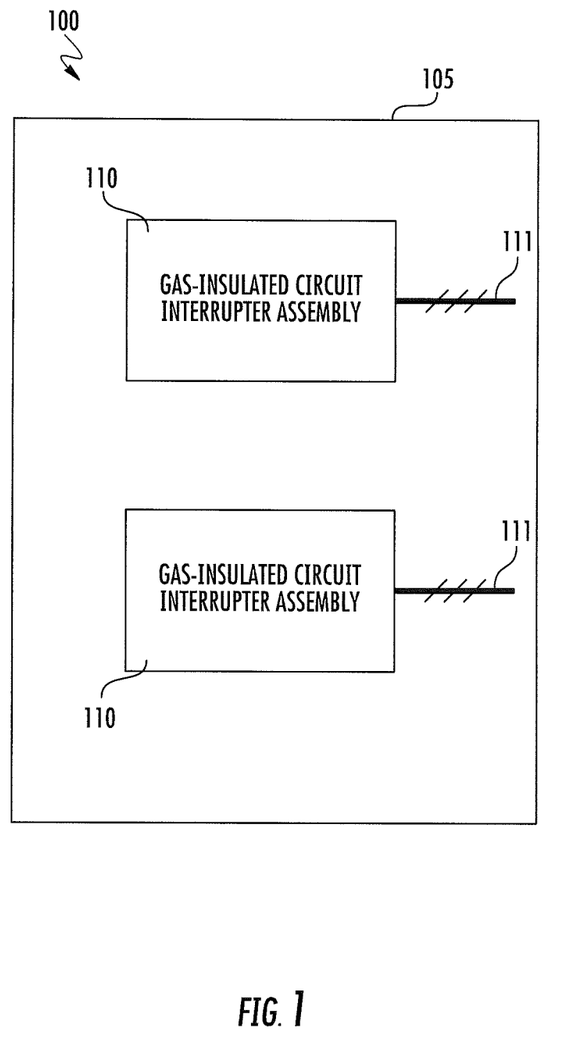
FIG. 1 is a schematic diagram illustrating a two-high circuit interrupter switchgear unit according to some embodiments of the inventive subject matter.

FIG. 1 schematically illustrates a switchgear unit 100 according to some embodiments of the inventive subject matter. The switchgear unit 100 includes a housing 105, which may be, for example, a generally rectangular cabinet-like metal enclosure. The housing 105 houses first and second gas-insulated circuit interrupter assemblies 110 in a vertically stacked arrangement. Respective buses 111 are coupled to respective ones of the first and second gas-insulated circuit interrupter assemblies 110, and may be used, for example, to connect the first and second gas-insulated circuit interrupter assemblies 110 to loads or sources via, for example, cables. The first and second gas-insulated circuit interrupter assemblies 110 may be fed from a common source or separately fed from separate sources. It will be appreciated that the first and second gas-insulated circuit interrupter assemblies may be three-phase assemblies.

Figure 2:
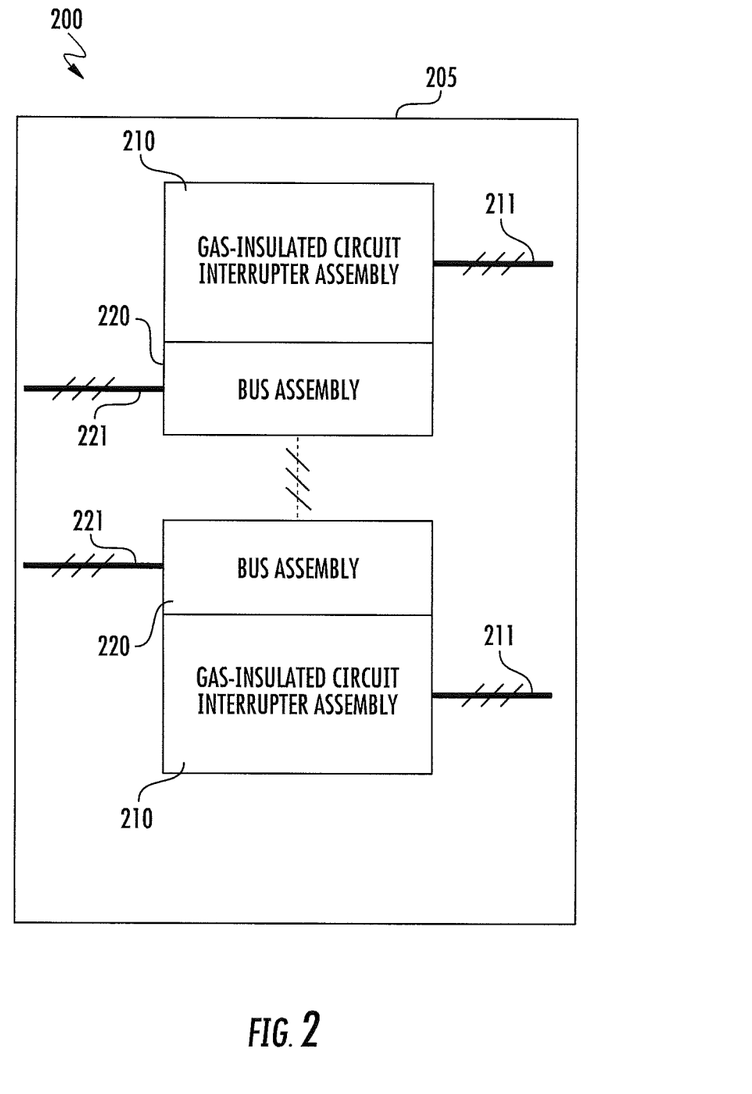
FIG. 2 is a schematic diagram illustrating a two-high circuit interrupter switchgear unit according to further embodiments of the inventive subject matter.

FIG. 2 schematically illustrates a switchgear unit 200 according to further embodiments of the inventive subject matter. The switchgear unit 200 includes a housing 205, which houses first and second gas-insulated circuit interrupter assemblies 210 in a vertically stacked arrangement. First and second bus assemblies 220 are disposed between the first and second gas-insulated circuit interrupter assemblies 210 and are configured to couple respective ones of the first and second gas-insulated circuit interrupter assemblies 210 to one or more buses 221, which may be connected, for example, to respective sources or loads or to a common source or load. Respective buses 211 are coupled to respective ones of the first and second gas-insulated circuit interrupter assemblies 210, and may be used to connect the first and second gas-insulated circuit interrupter assemblies 210 to sources or loads via, for example, cables. In some embodiments, the first and second bus assemblies 220 may be interconnected to parallel source inputs to the first and second gas-insulated circuit interrupter assemblies 210. This can provide advantages, such as increased ampacity and flexibility in arrangement of buses, as explained in detail below.

The first and second bus assemblies 220 may be three-phase bus arrangements, and the gas-insulated circuit interrupter assemblies 210 may each include, for example, multiple circuit interrupters (e.g., one for each phase). The gas-insulated circuit interrupter assemblies 210 and the bus assemblies 220 may further include various additional components, including, but not limited to voltage transducers, current transducers, disconnect switches, actuator mechanisms, and the like.

Figure 3:
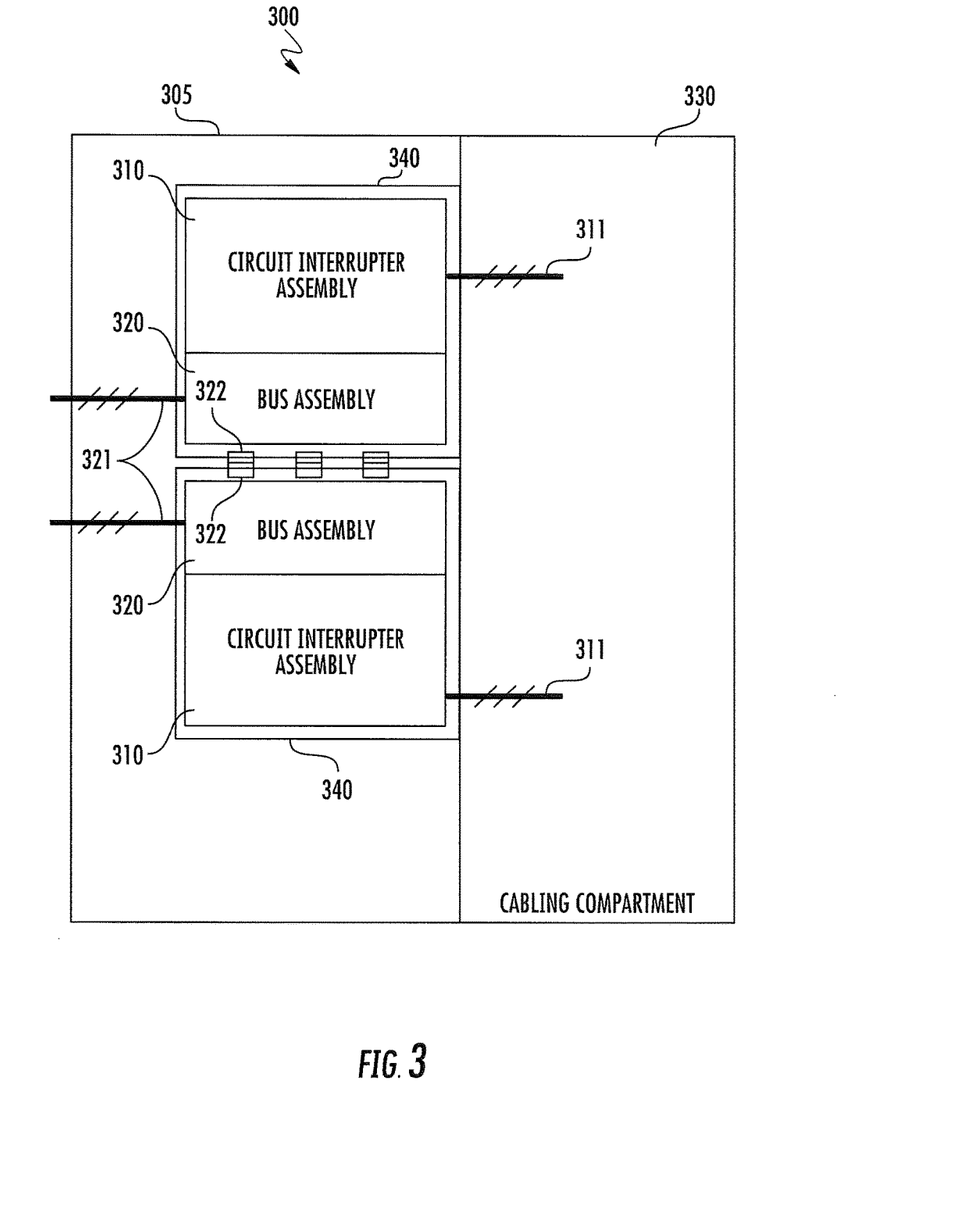
FIGS. 3 and 4 are schematic diagrams illustrating gas containment compartment arrangements for a two-high circuit interrupter switchgear unit according to further embodiments.

FIG. 3 illustrates a switchgear unit 300 according to further embodiments. The switchgear unit 300 includes a housing 305, which houses first and second gas containment compartments 340 disposed in a vertically stacked arrangement. A circuit interrupter assembly 310 and a bus assembly 320 electrically connected thereto are disposed within each of the gas containment compartments 340. The circuit interrupter assemblies 310 may include, for example, vacuum circuit interrupters. The bus assemblies 320 are configured to be coupled to sources or loads via buses 321 and may be interconnected by sealed connectors 322 located at walls of the gas containment compartments 340. The sealed connectors 322 may have any of a number of different configurations. For example, the sealed connectors 322 may be female-type sealed connectors that are interconnected using cable plugs as discussed below with reference to FIGS. 5 and 6, or the connectors 322 may be configured as male and female counterparts configured to be interconnected without the use of an intervening coupler. A cabling compartment 330 may adjoin the first and second gas containment compartments 340, and respective ones of the circuit interrupter assemblies 310 may be connected to cables in the cabling compartment via respective buses 311 that extend into the cabling compartment 330. The gas containment compartments 340 may be filled with $SF_6$ or another dielectric gas, thus providing gas insulation of the components within the compartments 340.

Figure 4:
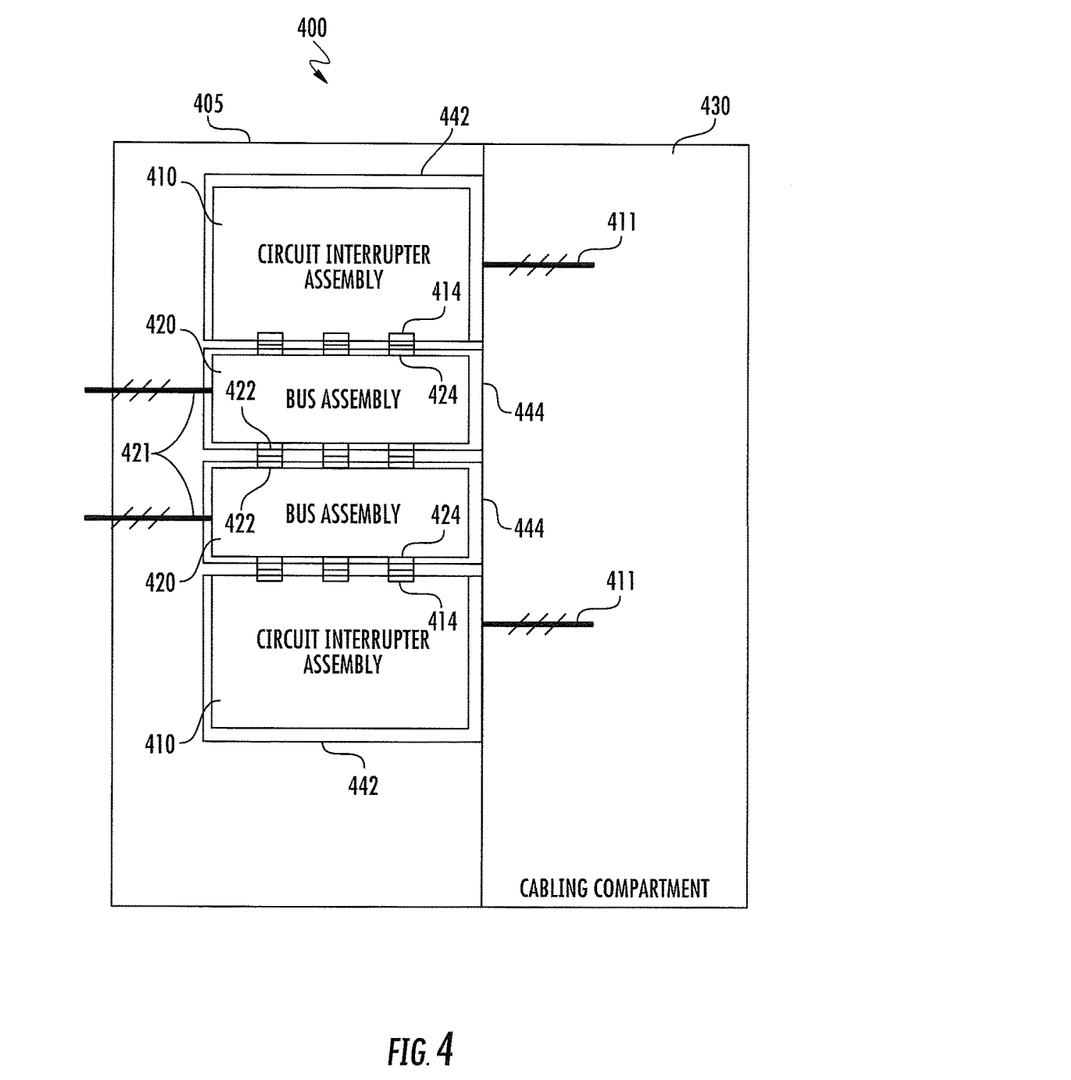

FIG. 4 illustrates a switchgear unit 400 with an alternative configuration according to further embodiments. The switchgear unit 400 includes a housing 405, which houses first and second gas containment compartments 442. The first and second gas containment compartments 442 contain circuit interrupter assemblies 410. The circuit interrupter assemblies 410 may include, for example, vacuum circuit interrupters and/or other types of circuit interruption devices. First and second bus assemblies 420 are electrically coupled to the circuit interrupter assemblies 410 and contained in adjoining third and fourth gas containment compartments 444. The first and second bus assemblies 420 may be interconnected by sealed connectors 422 at walls of the third and fourth gas containment compartments 444, and each of the first and second circuit interrupter assemblies 410 may be connected to a corresponding one of the first and second bus assemblies 420 via sealed connectors 414, 424 at adjoining walls of the gas containment compartments. The bus assemblies 420 are configured to respective buses 421, and respective ones of the circuit interrupter assemblies 410 may be connected to cables in an adjoining cabling compartment 430 via respective buses 411.

It will be appreciated that the structures shown in FIGS. 3 and 4 may be implemented in a modular fashion. For example, referring to FIG. 3, the gas containment compartments 340 and components therein may be fabricated as modules that are configured to be installed in the housing 305. In some embodiments, such modules may be specifically configured for use as the upper and lower modules. In some embodiments, a common module configuration may be used for both upper and lower units. Referring to FIG. 4, the first, second, third and fourth gas containment compartments 442, 444 and components therein may be similarly configured as modules.

Figure 5A:
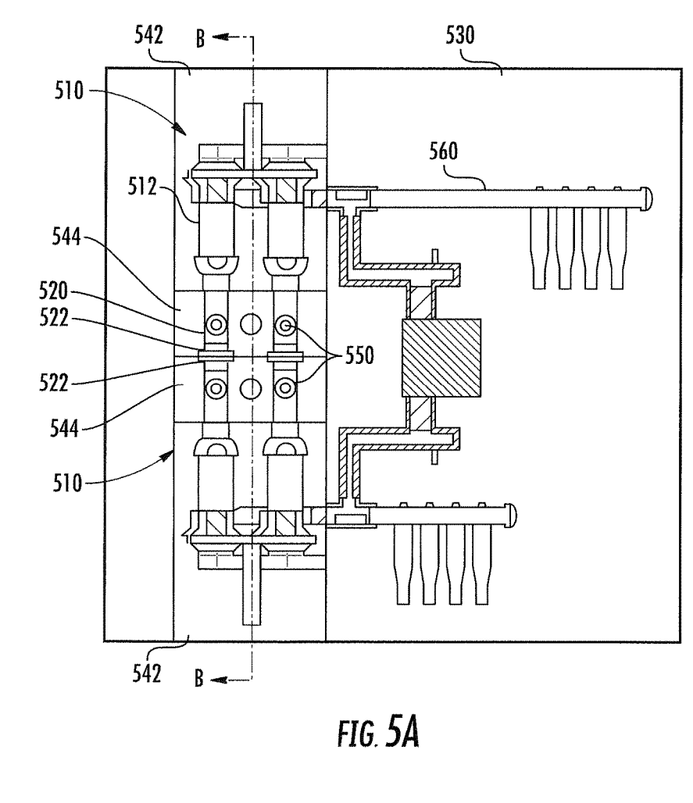
FIGS. 5A and 5B are cross-sectional views of a circuit interrupter switchgear unit according to further embodiments.
Figure 5B:
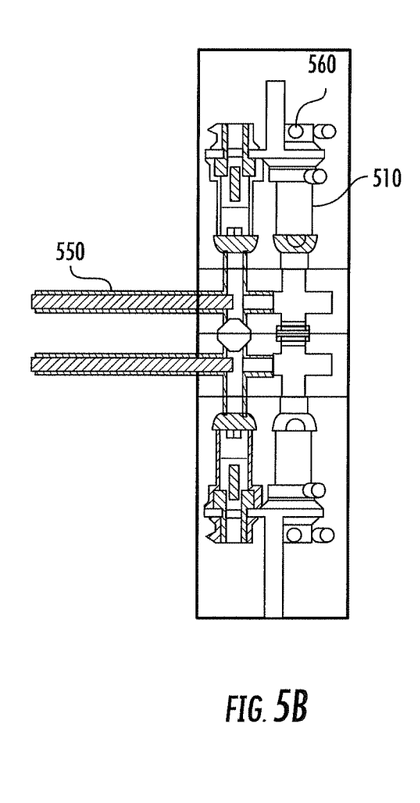

FIG. 5A is a side cutaway views of an exemplary arrangement for a switchgear unit that uses a modular bus and circuit interrupter arrangement according to some embodiments, and FIG. 5B is a cutaway view of the arrangement of FIG. 5A along a perpendicular plane indicated by a line B-B in FIG. 5A. First and second circuit interrupter assemblies 510 are disposed in first and second gas containment compartments 542. The circuit interrupter assemblies 510 each include a plurality of circuit interrupters 512. The circuit interrupters 512 are coupled to respective bus assemblies 520 contained with third and fourth gas containment compartments 544 that are disposed between the first and second gas containment compartments 542. Buses 560 are coupled to the circuit interrupters 512 and extend into a cabling compartment 530. As shown, the buses 560 may be arranged such that cable entry and connections may be offset.

Figure 6:
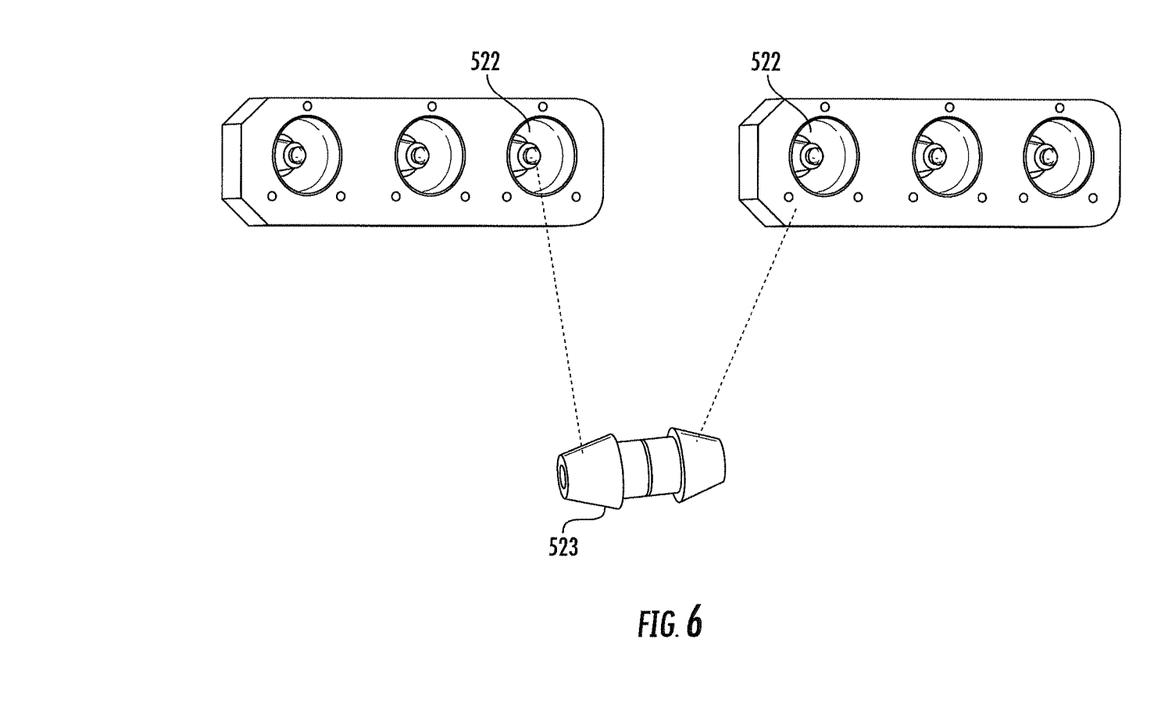
FIG. 6 illustrates a sealed connector arrangement for use in the embodiments of FIGS. 3-5.

Buses of the bus assemblies 520 are connected to buses 550, and can be interconnected via sealed connectors 522 using coupling plugs. In particular, as shown in FIG. 6, sealed connectors 522 may be conical-profile receptacles that can be interconnected using cable plugs 523 that are configured to be inserted into each of the sealed connectors 522 to provide an electrical interconnection. Examples of such connectors and cable plugs include, for example, those used in the FLINK bus bar coupling system distributed by Pfisterer Holding AG and described at catalogue.pfisterer.com/en/connections-6-52-kv/other-connectors/busbar-coupling-system-flink/. Similar connector arrangements may be used for interconnection of the circuit interrupter assemblies 510 to the bus assemblies 520. In further embodiments, other connector configurations may be used to join the various gas-insulated components together, such as connector arrangements in which male and female counterpart connectors may be provided on respective gas-insulated units to be joined, such as between the circuit interrupter assemblies 510 and the bus assemblies 520.

Figure 7:
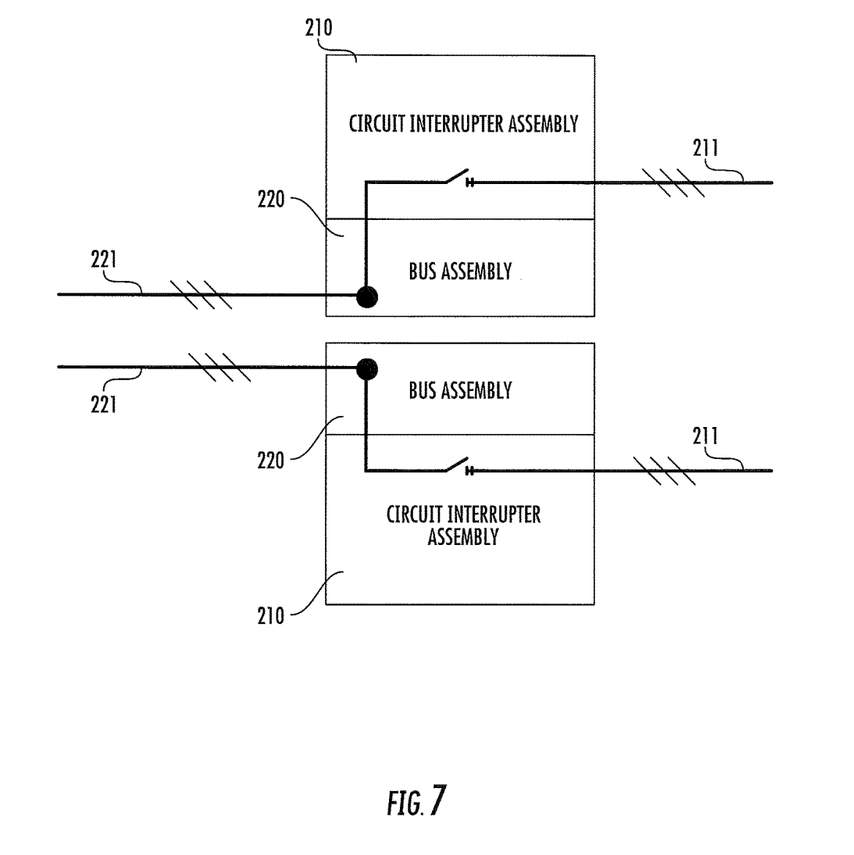
FIGS. 7-9 are schematic diagrams of circuit configurations that may be supported by the embodiments of FIGS. 2-6.
Figure 8:
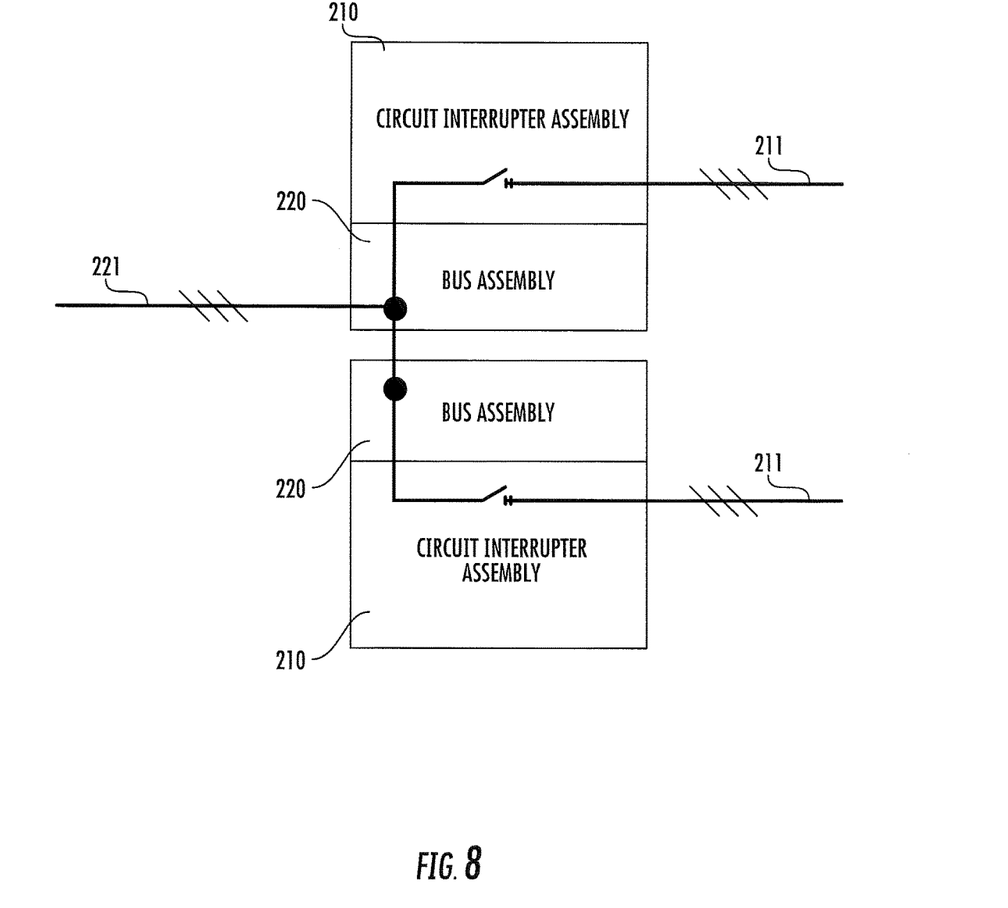
Figure 9:
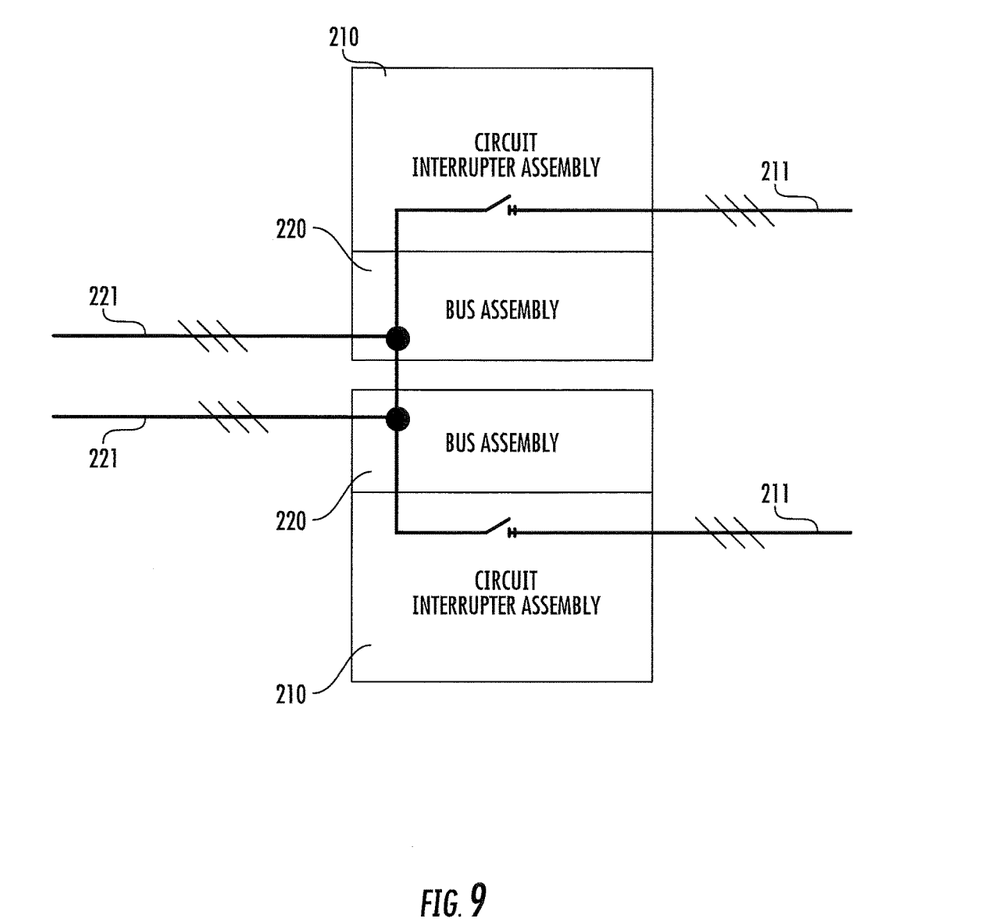

Arrangements along the lines illustrated in FIGS. 3-5 can support a variety of bus arrangements. For example, as illustrated in FIG. 7, bus assemblies 220 along the lines discussed above with reference to FIG. 2 may be separately connected to sources or loads by respective separate buses 221. Alternatively, as shown in FIG. 8, the bus assemblies 220 may be interconnected to allow for connection to a common source or load. In a third configuration shown in FIG. 9, the bus assemblies 220 may be coupled to respective buses 221, but interconnected to, for example, provide increased ampacity by paralleling the buses 221.

Figure 10:
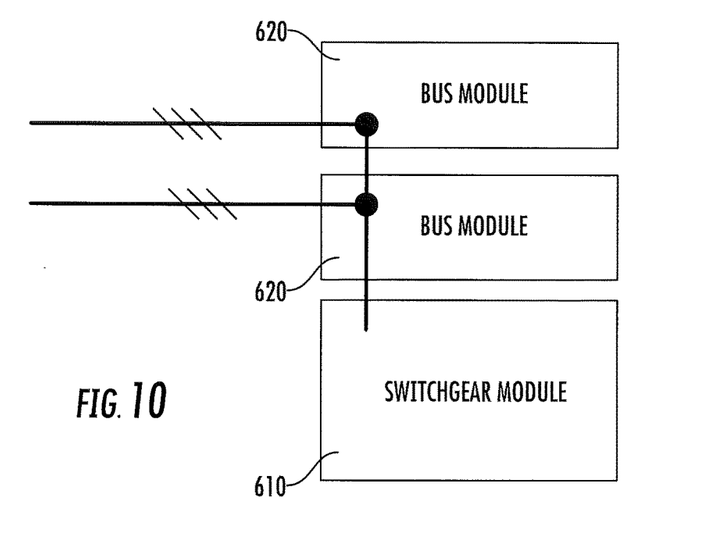
FIGS. 10 and 11 are schematic diagrams illustrating modular bus connections for switchgear or other apparatus according to further embodiments.

According to further embodiments, a modular bus approach along the lines described above may be applicable beyond the dual circuit breaker arrangements discussed above. As shown in FIG. 10, for example, a switchgear module 610, e.g., an assembly including circuit interrupters, disconnect switches, and/or other switchgear components, may be configured to be coupled to one or more bus assembly modules 620. The bus assembly modules 620 may be interconnected to provide a flexible and scalable bus structure along the lines discussed above. In this manner, for example, a desired bus capacity and/or conductor arrangement may be provided that is tailored to a particular application.

Figure 11:
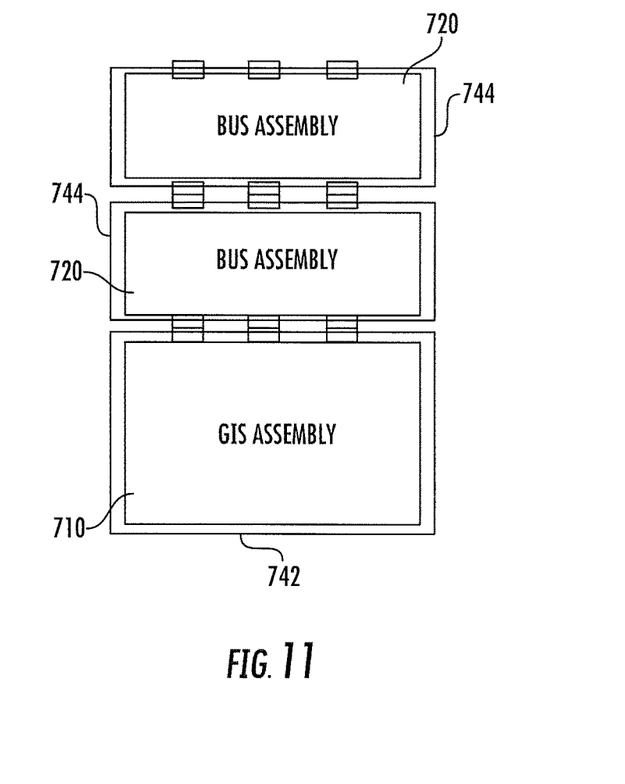

In some embodiments, such modular components may be gas-insulated and interconnected along the lines discussed above. For example, as illustrated in FIG. 11, a GIS assembly 710 (e.g., an assembly including circuit interrupters and/or other switchgear components therein) may be contained in a gas containment compartment 742 to provide a module. One or more bus assemblies 720 may be contained in respective separate gas containment compartments 744 to provide bus assembly modules that may be interconnected and electrically coupled to the module containing the GIS assembly 710.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
a housing;
a first gas containment compartment in the housing;
a second gas containment compartment disposed in the housing above the first gas containment compartment;
at least one first gas-insulated circuit interrupter in the first gas containment compartment;
at least one second gas-insulated circuit interrupter in the second gas containment compartment; and
a bus assembly disposed between the at least one first gas-insulated circuit interrupter and the at least one second gas-insulated circuit interrupter and configured to selectively couple the at least one first gas-insulated circuit interrupter and the at least one second gas-insulated circuit interrupter to at least one source or load external to the first and second gas containment compartments, wherein the bus assembly comprises at least one first bus coupled to the at least one first gas-insulated circuit interrupter and at least one second bus coupled to the at least one second gas-insulated circuit interrupter and configured to be selectively coupled to the at least one first bus.

2. The apparatus of claim 1, wherein the at least one first bus and the at least one second bus are configured to be interconnected via at least one sealed connector.

3. The apparatus of claim 2, wherein the at least one first bus is disposed in the first gas containment compartment and wherein the at least one second bus is disposed in the second gas containment compartment.

4. The apparatus of claim 2 wherein the at least one first bus is disposed in a third gas containment compartment and wherein the at least one second bus is disposed in a fourth gas containment compartment.

5. The apparatus of claim 1, further comprising:
a cabling compartment in the housing and adjoining each of the first and second gas containment compartments; and
first and second buses in the cabling compartment, electrically coupled to respective ones of the at least one first gas-insulated circuit interrupter and the at least one second gas-insulated circuit interrupter and configured to be coupled to respective first and second sets of cables within the cabling compartment.

6. The apparatus of claim 5, wherein the first and second buses in the cabling compartment are configured to offset the first and second sets of cables.

7. A switchgear unit comprising:
a housing;
a first gas containment compartment in the housing;
a second gas containment compartment in the housing and disposed above the first gas containment compartment;
a first plurality of circuit interrupters in the first gas containment compartment;
a second plurality of circuit interrupters in the second gas containment compartment; and
a first plurality of buses and a second plurality of buses coupled to respective ones of the first plurality of circuit interrupters and the second plurality of circuit interrupters and disposed between the first plurality of circuit interrupters and the second plurality of circuit interrupters, wherein the first and second pluralities of buses are disposed in respective ones of third and fourth gas containment compartments disposed between the first and second gas containment compartments.

8. The switchgear unit of claim 7, wherein the first and second pluralities of buses are configured to be pluggably connected to one another.

9. The switchgear unit of claim 7, further comprising:
a cabling compartment in the housing and adjoining each of the first and second gas containment compartments; and
first and second cable connection buses in the cabling compartment, electrically coupled to respective ones of first plurality of circuit interrupters and the second plurality of circuit interrupters and configured to be coupled to respective first and second sets of cables within the cabling compartment.

10. The switchgear unit of claim 9, wherein the first and second cable connection buses are configured to offset the first and second sets of cables in the cabling compartment.

11. A switchgear unit comprising:
a housing;
a first plurality of gas-insulated circuit interrupters and a second plurality of gas-insulated circuit interrupters vertically stacked in the housing; and
at least one bus assembly disposed between the first and second pluralities of gas-insulated circuit interrupters and configured to connect the first and second pluralities of gas-insulated circuit interrupters to at least one source or load external to the housing, wherein the at least one bus assembly comprises first and second bus assemblies coupled to respective ones of the first and second pluralities of gas-insulated circuit interrupters and configured to be selectively interconnected.

12. The switchgear unit of claim 11, wherein the bus assembly is configured to provide selective interconnection of the first and second pluralities of gas-insulated circuit interrupters.

\* \* \* \* \*